United States Patent [19]
Crittenden et al.

[11] Patent Number: 5,566,351
[45] Date of Patent: Oct. 15, 1996

[54] ADAPTIVE POLLING SYSTEM BY GENERATING SEQUENCE OF POLLING SIGNALS WHOSE MAGNITUDES ARE FUNCTIONALLY RELATED TO THE OCCURRENCE OF THE BUSY SIGNAL

[75] Inventors: John M. Crittenden, Austin; Chris A. Schwendiman, Round Rock, both of Tex.

[73] Assignee: International Business Machines Corporation, Armonk, N.Y.

[21] Appl. No.: 262,703

[22] Filed: Jun. 20, 1994

[51] Int. Cl.$^6$ .................... G06F 11/34; G06F 13/00
[52] U.S. Cl. .................... 395/867; 364/130; 364/148; 364/166; 364/514 B; 395/182.19; 395/550; 395/835; 395/839
[58] Field of Search .................... 177/25.11; 370/60, 370/84; 377/20; 455/58.1; 340/825.8; 395/114, 550, 868, 182.19, 835, 839; 364/130, 148, 166, 514 B

[56] References Cited

U.S. PATENT DOCUMENTS

| | | | |
|---|---|---|---|
| 3,634,869 | 1/1972 | Hsueh | 307/234 |
| 3,665,406 | 5/1972 | Gallagher et al. | 340/172.5 |
| 4,027,289 | 5/1977 | Toman | 340/172.5 |
| 4,156,472 | 5/1979 | Kunz | 177/25 |
| 4,159,516 | 6/1979 | Henrion et al. | 364/200 |
| 4,342,082 | 7/1982 | Brown et al. | 364/200 |
| 4,352,201 | 9/1982 | Miller | 455/58 |
| 4,383,166 | 5/1983 | Chu et al. | 377/20 |
| 4,450,481 | 5/1984 | Dickinson | 358/114 |
| 4,499,536 | 2/1985 | Gemma et al. | 364/200 |
| 4,598,363 | 7/1986 | Clark et al. | 364/200 |
| 4,638,428 | 1/1987 | Gemma et al. | 395/729 |
| 4,894,822 | 1/1990 | Buhrke et al. | 370/60 |
| 4,931,924 | 6/1990 | Kageura | 364/200 |
| 5,010,329 | 4/1991 | Nagakura | 340/825.8 |
| 5,023,869 | 6/1991 | Grover et al. | 370/84 |
| 5,038,275 | 8/1991 | Dujari | 364/200 |
| 5,070,526 | 12/1991 | Richmond et al. | 379/372 |
| 5,081,577 | 1/1992 | Hatle | 364/200 |
| 5,095,526 | 3/1992 | Baum | 395/725 |
| 5,230,067 | 7/1993 | Buch | 395/275 |
| 5,301,278 | 4/1994 | Bowater et al. | 395/275 |
| 5,414,858 | 5/1995 | Hoffman et al. | 395/868 |
| 5,467,463 | 11/1995 | Siegel | 395/550 |
| 5,471,564 | 11/1995 | Dennis et al. | 395/114 |

FOREIGN PATENT DOCUMENTS 0273080  7/1988  European Pat. Off. .

OTHER PUBLICATIONS

R. W. Farr et al., "Dynamically Optimized Polling System", IBM Technical Disclosure Bulletin, vol. 20, No. 2, pp. 773–774.

C. W. Christensen et al., "Adaptive Polling", IBM Technical Disclosure Bulletin, vol. 19, No. 7, pp. 2721–2724.

*Primary Examiner*—Thomas C. Lee
*Assistant Examiner*—Po C. Huang
*Attorney, Agent, or Firm*—Robert M. Carwell

[57] ABSTRACT

System timers set by a central processing unit (CPU) provide a variable wait time functionally adapted and related to peripheral device availability. Wait time is iteratively and dynamically adjusted to more closely match peripheral performance to the system, thereby reducing CPU load and enhancing data throughput, with the data output routine executing at a process level rather than an interrupt level.

In a preferred embodiment, the prior wait time is cumulated during which the peripheral is unavailable for data in order to form a running average delay utilized as a starting point for a next data input. Large delays are weighted to avoid skewing average wait time too quickly for infrequent longer events. Data throughput is thereby increased, avoiding unnecessary dormant periods with no output from the system, while, at the same time, CPU loading is reduced by avoiding excessive system polling.

10 Claims, 3 Drawing Sheets

ADAPTIVE POLLING SYSTEM BY GENERATING SEQUENCE OF POLLING SIGNALS WHOSE MAGNITUDES ARE FUNCTIONALLY RELATED TO THE OCCURRENCE OF THE BUSY SIGNAL

TECHNICAL FIELD

This invention relates to input-output (I/O) management in computer systems and, more particularly, relates to a polling system and method for supporting peripheral devices in such systems.

BACKGROUND OF THE INVENTION

In the evolution of computers, two systems were developed for handling the interaction between the computer and peripheral devices such as printers, plotters, disk drives, and the like.

The first such system is known in the art as an "interrupt" driven system. Parallel printers typically have employed an interrupt driven port device driver for handling the printer and parallel port which, for reasons which will be hereinafter set forth, often resulted in unnecessarily high CPU usage and poor system response.

Although the advances provided by the subject invention are most easily understood with respect to the conventional example of printers operating on such a parallel port, the invention is not intended to be so limited and admits to application to I/O problems associated with other devices and other ports such as serial ports.

In accordance with the conventional operation of such an interrupt-driven printer device driver, a byte of data is strobed to the printer, whereupon the printer typically responds by pulsing an acknowledgement or "ack" line, thereby generating an "interrupt" serviced by the corresponding CPU interrupt routine. The device driver interrupt routine thereafter strobes out a next byte of data for the printer, and the cycle continues.

In the earlier days of computing, such parallel printers were provided which worked quite well in relatively simple systems such as those employing 8 bit CPUs at relatively low nominal clock rates of 4 megahertz. These printers were designed to be interrupt driven so that each character to be printed presented the CPU with an interrupt. The CPU would fetch a byte from memory corresponding to a character for each interrupt for delivery to the printer, whereupon it was subsequently printed. Such interrupt-driven printers, which were relatively slow and unintelligent, were for the most part found acceptable even though they exhibited relatively low data throughput. In part this acceptance was due to the aforementioned relative simplicity of the CPU itself and the resulting slow performance of its other tasks.

One problem however with this approach of interrupt driven systems is that asynchronous hardware interrupts are relatively "expensive" in terms of CPU usage. In order to respond to an interrupt in a timely manner, the CPU's operating system must immediately save the current machine state, execute the appropriate interrupt handler, and then restore the machine state.

In simplistic terms this meant that upon occurrence of an interrupt the computer system must cease its current process (such as tracing a diagram), enter the interrupt service routine, perform whatever process was necessary to handle the routine (e.g. writing a byte to the printer, etc.), as well as storing and restoring the state variables of the machine environment so that the process which was interrupted could be restarted at the appropriate place. Such state variables would include, of course, the numerous CPU registers and stack. Thus it may be appreciated that when the CPU was thereby required to interrupt performance of its system functions and duties to handle an interrupt from a parallel port, instances would arise when this became a problem in terms of unduly loading the system.

As previously noted, the earlier systems were reasonably tolerable wherein the system CPU handled simple data transfer to peripheral devices (such as one byte ASCII characters) without hardware assist provided by printer coprocessors or the like—this, notwithstanding that the CPU was transferring data a byte at a time. However, eventually this problem of slow data rates and processor loading due to interrupts became noticeable enough as to actually become unacceptable.

A very practical example of how this problem of loading the CPU with interrupts manifested itself and been exacerbated relates to the evolution in complexity of peripheral devices themselves. For example, as printers became more powerful (such as those compatible with the postscript language and providing sophisticated graphics), the need for greater throughput to the printer rose significantly in order to fully utilize its potential. This capacity for increased throughput was in part due to dedicated processors and buffers being provided in the printer itself. It is not uncommon today to encounter printers which may accept 50,000 characters or more per second handling huge postscript graphics files on the order of 10 megabytes or more which must be dumped from the CPU to the printer at these immense data rates. It will thus be appreciated that the CPU having to handle in excess of 50,000 interrupts per second for a peripheral device severely impacts its ability to perform other necessary functions.

One of the fundamental problems with such interrupt-driven systems is that whenever an event occurs (such as desired printing of the character) an interrupt is generated conveying to the CPU such desire. However, the peripheral device, such as a printer in this case, may nevertheless be incapable of printing a character at the time of the interrupt for various reasons (out of paper, line or sheet feed, malfunction, or the like). Nevertheless, the CPU invokes the interrupt handler and processes the interrupt even if the net result thereof is an inability to carry out the task prompting the interrupt in the first place. It may readily be appreciated that as the rate of these interrupts increased, this would often result in a substantial amount of the bandwidth of the CPU being needlessly wasted processing these interrupts which resulted in no action due to the particular state of the peripheral device].

The other basic system for handling the interaction between computers and peripheral devices is known in the art as a "polled" system. In such a polled system, a peripheral device was polled periodically at intervals to check its state and receptiveness to data throughput from the CPU. While this seemed to work in certain systems, there was nevertheless a fundamental problem which may be illustrated again utilizing the printer example. Many peripheral devices have widely varying delay characteristics dependent upon the particular function being executed at a given time. For example, one may appreciate the difference in delay associated with even modern laser printer handling very simple ASCII text on the one hand, or the aforementioned highly complex graphics tasks such as those associated with a postscript file. These delay characteristics of peripherals will vary widely dependent on numerous factors such as, in the case of a printer, the particular print engine, inasmuch as there is even a dedicated processor in some such printers. Throughput might be relatively rapid for graphics files wherein the printer itself has very little processing to do. However, a postscript file might result in such a printer being busy a proportionately higher amount of time because the dedicated processor therein must interpret the postscript data with the printer. From the foregoing, it should be apparent that whereas a polled system might avoid some of the problems associated with the previously described interrupt system (wherein interrupts unnecessarily tie up the CPU), the polling system itself has difficulty in handling peripheral devices with such widely varying timing requirements.

This problem with polled systems gave rise to efforts to attempt to tune such polled systems to provide an optimum balance between system load and data throughput. An illustrative example of such an approach may be found in U.S. Pat. No. 5,081,577 to Hatle. This system sought to optimize a representative fixed delay between polls which was judiciously selected based upon the characteristics of the particular peripheral device. The polling interval was optimized so as to not be too frequent (such that it would occur too often when the peripheral device was busy) and yet not too infrequent (whereby the throughput was adversely affected because the peripheral device was idle awaiting a poll).

Whereas this approach appeared to afford advantages over interrupt driven systems, it nevertheless became readily apparent that an inherent weakness of the system was that it was extremely inflexible. Each peripheral device has differing delay characteristics depending upon its particular functions. When a peripheral device in accordance with the Hatle system was changed, the optimized polling interval might be completely inappropriate, thereby resulting in the need to re-optimize. There was no provision for user-settable polling parameters. Even if this were possible, it would presume a level of knowledge about the peripheral device in the user which, as a practical matter, is unrealistic. Thus, the assumption was that either the provider of a device driver knew the device well enough to provide an appropriate polling period or a system such as that of Hatle could be provided to optimize on the polling period.

However, as we have just seen in the case of a laser printer, many peripheral devices have widely varying delay characteristics. Thus, a fixed polling interval is inappropriate when different peripheral devices are attached to the system. Even as to a particular peripheral device, attempting to optimize the fixed polling period in the manner of Hatle, often resulted in unacceptable system loads on the CPU and/or low data throughput to the peripheral device.

For all the foregoing reasons, an improvement was needed for systems in which hardware is attempting to pass data through to a peripheral device at improved rates and wherein the system is taking up too much CPU time in the interrupt or polling processes.

Moreover, such a system was needed which was applicable to a plurality of different peripheral devices each having its own range of delay characteristics, wherein a better tradeoff was could be between system loading and data throughput than is afforded with conventional systems such as those employing optimized regular polling intervals in the manner of Hatle.

Accordingly it was further an object of the invention to provide for a dynamically changing delay whereby when a printer for example is operating rapidly, throughput delays are minimized and the system will keep up in sync with the printer whereas, if the printer buffer fills up, the polling delay is thereby adapted so that the system is not polled as hard, leaving it free to perform other functions.

In short, it was desirable to provide a system for use with peripheral devices which could exhibit lower system loading as well as improved data throughput.

These and other objects of the invention are achieved which will be described in greater detail with reference to the following figures wherein:

SUMMARY OF THE INVENTION

Figure 1:
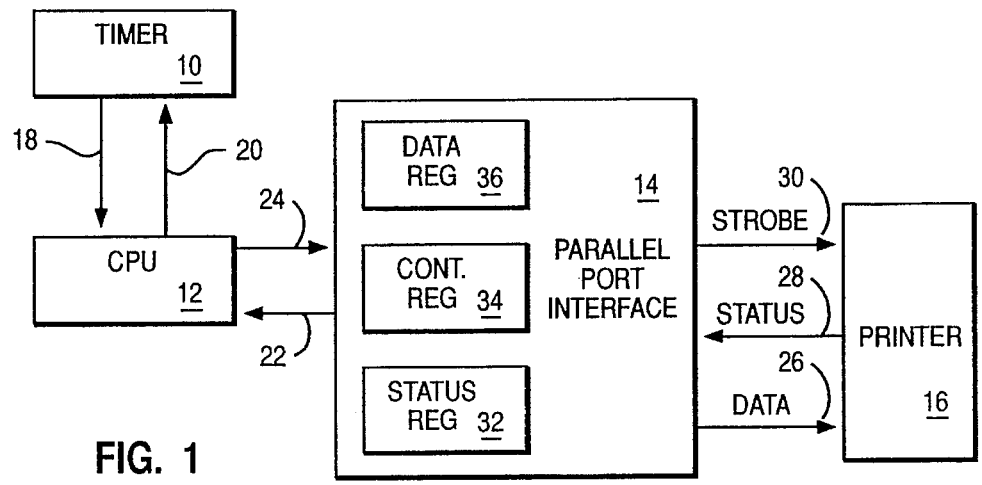
FIG. 1 illustrates a high level functional block diagram of a computer system including a representative peripheral device with a peripheral interface operating under software control in accordance with the invention.

System timers set by a central processing unit (CPU) provide a variable wait time functionally adapted and related to peripheral device availability. Wait time is iteratively and dynamically adjusted to more closely match peripheral performance to the system, thereby reducing CPU load and enhancing data throughput, with the data output routine executing at a process level rather than an interrupt level.

In a preferred embodiment, the prior wait time is cumulated during which the peripheral is unavailable for data in order to form a running average delay utilized as a starting point for a next data input. Large delays are weighted to avoid skewing average wait time too quickly for infrequent longer events. Data throughput is thereby increased, avoiding unnecessary dormant periods with no output from the system, while, at the same time, CPU loading is reduced by avoiding excessive system polling.

DETAILED DESCRIPTION OF THE PREFERRED EMBODIMENT

First a higher level description of the operation of the invention will be provided followed by a more detailed description of the preferred embodiment. In a very general sense, the invention avoids the problems associated with interrupt-based systems. It will be recalled that in order to maintain a required data throughput in such systems, this unfortunately often resulted in an unnecessary inordinate number of interrupts tying up the computer system. The systems was thereby precluded from performing other functions. The interrupts were processed though they did not result in data output due to the peripheral device being in a state wherein it could not accept such data.

The adaptive polling technique in accordance with the invention accordingly does not use familiar interrupts such as printer interrupts associated with printers. On the contrary, system timers are provided, causing the system to "sleep" while, in the case of a printer example, the printer is not available to receive data. This departure from interrupt-driven systems was because the traditional method of handling the parallel port, for example, resulted in slow printing, high CPU usage, and poor system response.

In accordance with the invention, on the contrary, faster data throughput, lower CPU load, and better system response results. The amount of time the system sleeps, in accordance with a key aspect of the invention, is adjusted iteratively in order to match the speed of the peripheral device (such as a printer) as closely as possible, therefore minimizing CPU load and maximizing data throughput. The data output routine runs at a process level rather than an interrupt level. System response is thereby improved, because interrupts are never disabled. If the printer or other applicable peripheral device is ready, no sleep is performed, thereby allowing a maximum data throughput close to the theoretical maximum for a given CPU speed.

A novel characteristic of the adaptive polling technique in accordance with the invention is the manner in which the busy wait time of the peripheral device is computed dynamically. In a general sense, the total time the CPU spends waiting for the printer other peripheral device to be in a ready state is accumulated and employed to maintain a running average delay. This average is thereafter used as a starting point for the next polling delay. As will be hereinafter described in greater detail, relatively large delays associated with particular aspects of the given peripheral device may be weighted to avoid skewing upward too fast for an infrequent event (such as a form feed in the case of a printing device). The technique of the invention is essentially designed to maximize data throughput (e.g. to not permit an excessive sleep period) and to simultaneously minimize CPU load (e.g. to avoid excessive "busy" polling).

The foregoing thus—generally described adaptive polling technique of the invention has been successfully implemented and compared relative to traditional interrupt-driven device drivers as evidenced by the data which follows. A test case employed Model 530 and Model 601 RISC System/6000 computers (manufactured by the IBM Corporation) operating a typical print job (an 800K file output to an IBM 4029 printer) and the following data was obtained.

TABLE 1

| COMPUTER MODEL # | Interrupt Driven System | Polled System of Invention |
|---|---|---|
| | MAXIMUM DATA THROUGHOUT (KB/S) | |
| 330 | 15.9 | 27.1 |
| 601 | 34.9 | 102.1 |
| | CPU LOAD (800K FILE, KB/S) | |
| 530 | 14.3 (93%) | 23.8 (47%) |

The various functional blocks of FIG. 1 will now be described in greater detail. FIG. 1 is intended to illustrate a representative computer system such as an IBM RISC System/6000 model 520 manufactured by the IBM Corporation operating in conjunction with an appropriate operating system such as the AIX™[1] System also provided by the IBM Corporation. In such a system, a hardware timer 10 is typically provided to serve the purpose of delivering timer interrupts shown by arrow 18 to the CPU 12 at appropriate times. It is further conventional in such systems of FIG. 1 for the timer to be set by the CPU on line 20 whereupon after passage of a prescribed amount of real time, an interrupt will occur. Further, such timers typically have associated therewith software services callable by the CPU 12 to set up the timer 10. At the operating system level, the CPU programs the timer as shown by arrow 20 for the shortest time which needs to be requested by a process and accordingly sets the timer for such time. In practice there may be multiple timers which must be serviced and have timer service routines associated therewith which may all be called at the same time for handling. In summary, then, the CPU 12 sends on line 20 to the timer 10 a desired time interval and reads the timer as shown on line 18 to determine how much delay has passed and when it is appropriate to execute various routines upon indication of the timer interrupt on line 18.

[1]Trademark of the IBM Corporation

Continuing with FIG. 1, parallel port interface 14 is shown interconnected to the CPU 12 which, in accordance the invention, provides hardware I/O support between the CPU 12 and a peripheral device such as parallel port printer 16. Although a printer has been shown in FIG. 1, it will readily be appreciated that the teachings of the invention may be applicable essentially to any other peripheral device and thus the invention is not intended to be so limited. The parallel port interface is interconnected between the CPU 12 and printer 16 to control and coordinate the printer 16 under control of the CPU 12 in a manner to be hereinafter detailed.

A representative such parallel port interface 14 typically includes a data register 36, control register 34, and status register 32. The data register 36, in a typical implementation, may be an 8 bit register which the CPU 12 writes to on lines 24 when it is desired for a character to be printed by the printer 16, and thus the register stores the data associated with the given character. The control register 34 in like manner contains several bits in accordance with conventional teachings such as a strobe bit sent to the printer 16 on strobe line 30 serving the purpose of indicating to the printer when data is present in the data register 36 available for the printer 16. The status register 32 driven by the printer on line 28 is employed to provide data in the status register 32 to CPU 12 indicating the status of the printer 16, e.g. if it is on or off line, out of paper, in an error condition, ready for acceptance of character data on line 26, or the like, such status being conveyed back to the CPU 12 on line 22.

The CPU of FIG. 1 is controlled by an operating system such as previously mentioned the AIX UNIX based system although the invention is not intended to be limited to such operating systems. However one beneficial characteristic of such systems is their multitasking feature which lends itself to assisting in providing the lower system load and improved data throughput of the invention.

Figure 3:
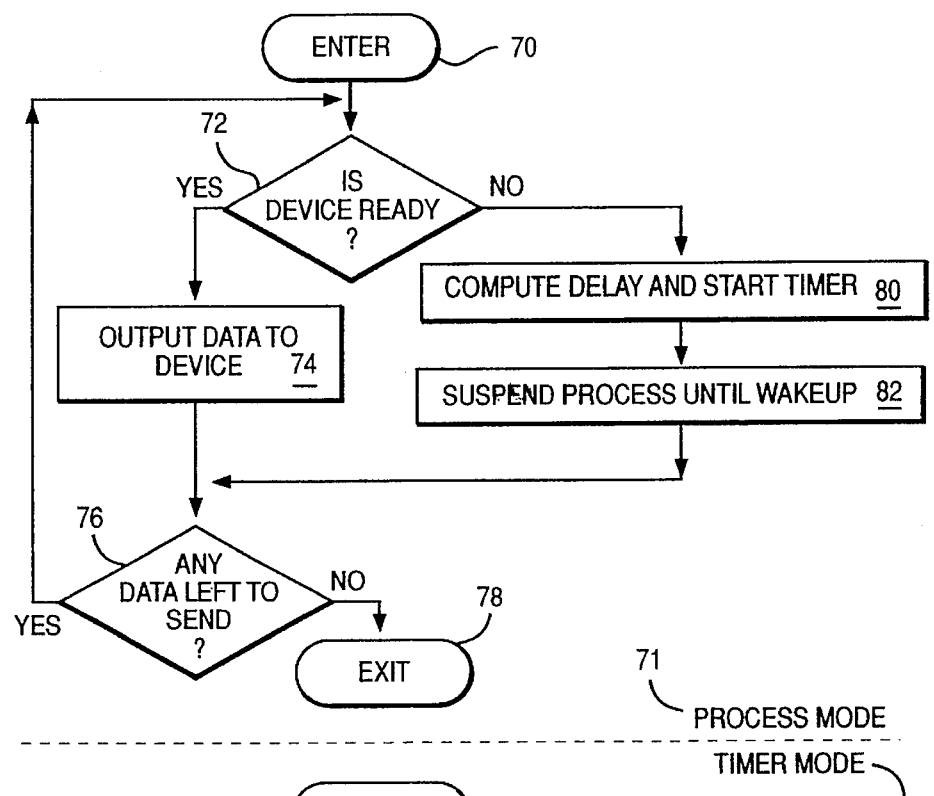
FIG. 3 is a flow diagram illustrating the process mode and timer mode of the system of FIG. 1 whereby the adaptive polling of the invention is effected.

Turning now to FIG. 3, there is shown a flow diagram which, when implemented, and when operating in conjunction with the system of FIG. 1 will provide such improved system loading and throughput. It will first be noted in FIG. 3 that a dividing line has been shown indicating separation of the various operations of the software module depicted therein into two basic categories, e.g. those portions of the software operating in the process mode 71, and those operating in the timer mode 72.

"Process mode" is a UNIX term referring to the mode executable processes run wherein an interruptable, preemptable scheduler may preempt a given task and run yet another task. This is the normal mode in which programs operating on the system of FIG. 1 execute. Referring to the "timer mode" 72 of FIG. 3, as previously described with reference to FIG. 1, a timer 10 is conventionally provided which presents the CPU 12 with interrupts 18 when the timer expires. This timer mode 72 is provided to indicate the details of the timer interrupt service routine itself which, contrary to the process mode 71, is a non-interruptable routine, the entirety of which does not loop but rather executes and exits.

It was previously noted that the system of FIG. 1 will execute a timer interrupt service routine. This routine includes a list of all such processes operating in the process mode 71 which request timers, and will periodically check to see which has expired and one by one call them all. The beneficial aspect of the multitasking operating system is that it will optimize these timers such that for a single timer interrupt of more than one timer routine may be serviced. Efficiency may thereby be obtained because system interrupts are not being received for every single process which has requested a timer. Accordingly by employing timer interrupts in this manner, greater efficiency is obtained.

In summary then, at a high level, the division between the process and timer mode indicates that the timer mode operation cannot be pre-empted by a process, However in such timer mode it must be entered and exited quickly because during execution thereof other interrupts are being held up. Conversely, the software when executing in the process mode is interruptable and will not cause system performance problems inasmuch as the aforementioned task scheduler can swap out given processes to enable functions associated with other interrupts (such as keyboard and mouse routines).

Turning now to FIG. 3 in greater detail to describe the data output portion of the routine, the routine is entered at block 70, whereupon the first thing accomplished in the process mode is to determine whether the peripheral device, (whether it be a printer or the like) is ready to accept data, shown at reference numeral 72. It will be recalled that this may be done physically by a check by the CPU of the status register 32 which, in turn, has received status information on line 28 from the printer 16. If the device is ready, the data is actually written out to the device, 74. A check is then made of the data register 36 or buffer at reference 76 to determine if any data such as characters are left in the buffer to be sent to the peripheral device. If so, the process loops back to block 72 and repeats. If, however, no such data remains, the routine exits, 78, and control is returned to the controlling process.

Continuing with FIG. 3, if in response to interrogating status of the printer, the CPU determines the peripheral device is not ready, a delay 80 to be hereinafter described is computed and a timer started, 80, and the calling process is suspended, 82. In short, at this point, a timer interrupt has been requested for a set delay and the calling process which was attempting to the write to the peripheral device is suspended or, in accordance with computer parlance, the process is "put to sleep". However, the system of FIG. 1 nevertheless permits other processes to execute at this point so that system loading is not adversely affected. As will be described further, when the timer service routines provides an appropriate "wakeup" signal, control will thereafter return to the suspended process. Once the timer has been set, 80, and the process suspended, 82, control resumes when the timer expires at the entry 84 at the timer mode 72.

In summary then, with reference to the process mode 71, the first time through, typically the device will be ready, data will be sent out and the process will loop back to block 72 and continue sending data until at some point the device is not ready. So long as it is ready, the loop at the left of the process mode 71 executes, allowing high data throughput as fast as the CPU can transmit it to the peripheral device. While the system is in the process mode, there is no significant system load. Although the calling process for printing or the like is utilizing the CPU, if another process requires the CPU the printing process may be interrupted and scheduled out, and another process scheduled in so that the system isn't "frozen" into only operating printing devices.

Continuing with FIG. 3, it is noted once the timer expires, the timer mode 72 is entered at reference 84. First, the system executes a check (similar to that at block 72) at block 86 to determine if the peripheral device is ready. If yes, data is similarly output to the peripheral device, 88. Also, similarly to the process mode, the data register or buffer is checked to determine if any more data is remaining, 90. If no more such data is available, exit from block 90 under the "no" path results in execution of the "wakeup process" 94 block of FIG. 3 wherein the "sleeping" process from which it was suspended at block 82 in the process mode is "woken up" or activated, 94, and the timer routine for mode 72 is exited, 100. Because in this manner of execution the timer was restarted, the process was woken up and control returned to block 82 whereupon, if no data is left to be sent, 76, the process is exited, 78.

Returning back to block 90 of FIG. 3, if data is left to be sent, block 92 is entered. This branch of the timer mode 72 performs the function of determining if the last "sleep" was less than an empirically set value dependent upon the particular peripheral device's characteristics in the system. A threshold value is provided which determines when to switch back to the process mode 71.

Returning to block 86, if the device is not in the condition to accept data, the flow is to block 96 whereupon statistical delay data is updated to update the timer and operation continues in the timer mode 72. In this rightmost branch of the timer mode 72 of FIG. 3, a running average is maintained of how long the system had to wait to output data to the peripheral device, e.g. a running average is calculated of how long the system had to wait between outputting a next character for example. This delay is updated, 96, and a new delay computed, 98, e.g. how long the system will wait for the next data to be output, whereupon the timer 10 is reset, and timer mode 72 process control exited at 100. Each time the computed delay expires, once again the timer mode 72 is entered at block 84.

Figure 4:
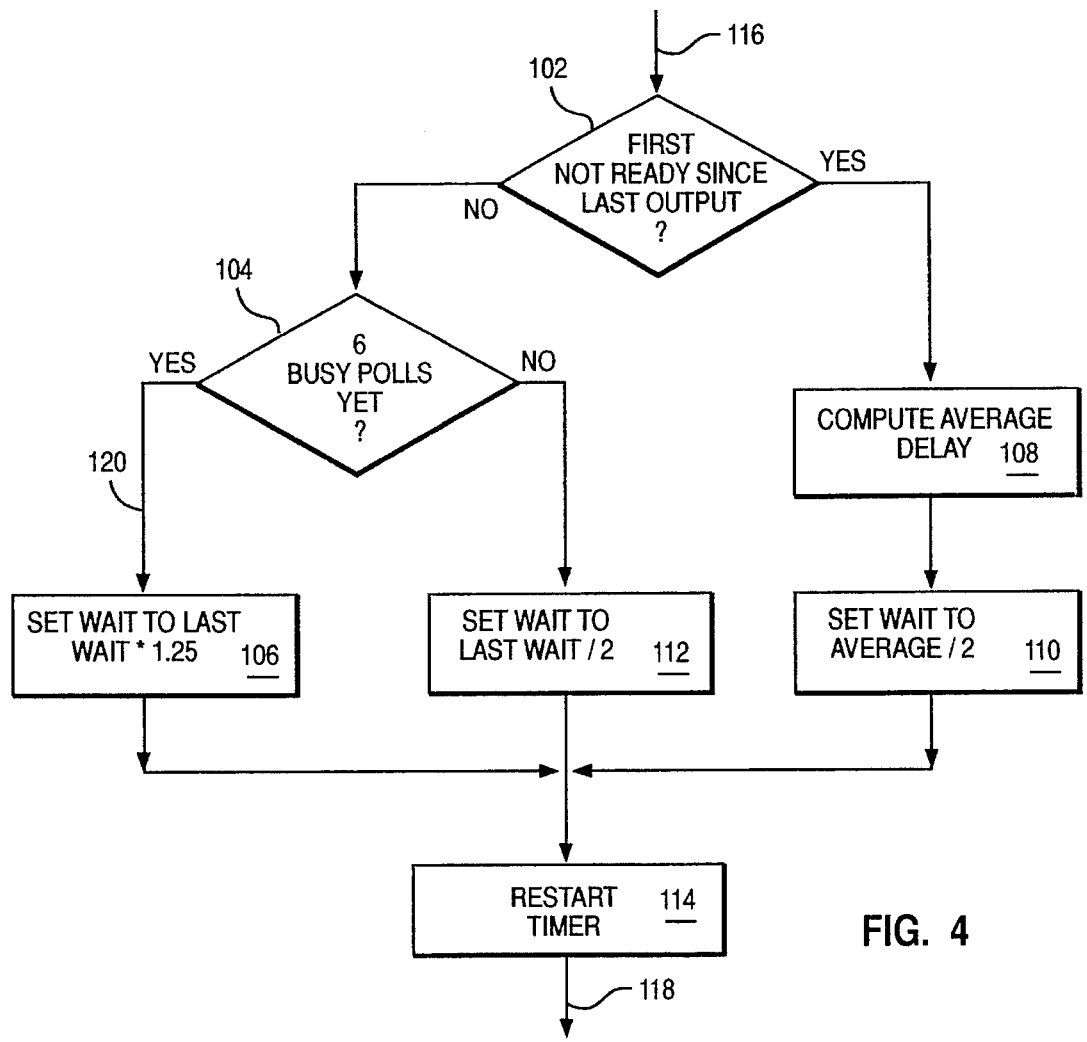
FIG. 4 is a more detailed flow diagram of block 98 of FIG. 3.

Referring now to block 96 and 98 in greater detail, as to how the delay in the preferred embodiment is computed, in FIG. 4 there is depicted in more detail a description of a flow diagram implementing blocks 96 and 98 of FIG. 3. More particularly, the subprocess of FIG. 4 is entered at arrow 116 which corresponds to entering the block 96 of FIG. 3. Similarly, the arrow 118 of FIG. 4 corresponds to the arrow exiting the block 98 of FIG. 3.

First, in FIG. 4, after the subprocess is entered at 116, a decision is made, 102, of as to whether this is the first occurrence of an indication of the peripheral device not being ready since the last data was output, this decision being shown at reference numeral 102. Essentially what is required to be determined at this point is whether current wait or delay, (e.g. the total wait being accumulated since the last time the system was enabled to output date) is ready to go into the average delay being calculated. If, as determined by block 102, this is a first occurrence of the peripheral being busy since the last time the system put a character or data out to the peripheral, then the subsystem of FIG. 4 exits to the right of block 102 and computes an average delay, 108, utilizing the total wait delay. In other words, a running average is maintained so that the last wait value is added or factored into the running average to arrive at a new average, whereupon the current waiting period set at block 110 to this running average is divided by 2. The reason for dividing the running average by 2 is as follows. Although this value is empirical, it will be recalled that in a preferred embodiment the system is running in a multitasking environment, e.g. not a true real-time environment. If a wait of 10 microseconds, for example, is requested, when control is returned to the timer routine it may thereby not be guaranteed that the delay will always be 10 microseconds, e.g. it may be 12 or 25, depending upon what the system or other processes or routines are doing.

The process in accordance with FIGS. 3 and 4 therefore takes this into account. In order to maintain data throughput at a maximum rate, rather try to wait again the exact time that the system would otherwise be busy, a delay is determined based on the running average, by setting the wait to the average divided by 2, at block 110, the system is thereby being required to only wait half that time. This is a tradeoff between adversely affecting system load, (e.g. by polling too much) and adversely affecting throughput (e.g. by polling too infrequently). In the latter case data throughput may drop off because the printer is available for data before being polled. It has thus been found that dividing the running average by 2 at block 110 is then effective in achieving the objectives of the invention. However, the invention is not intended to be so limited to such a factor and admits to varying this factor in accordance with conventional system tuning techniques well known in the art.

Continuing with FIG. 4, after setting this average wait, 110, the timer is restarted, 114, and the subprocess of FIG. 4 exited, 118.

Returning back to Block 104 of FIG. 4, if this is not the first "not ready" indication received since a last data output to the peripheral device (e.g. "no" of 102), then the subprocess next determines whether a preselected number of busy polls has occurred, block 104. If not, the first wait is set to the average wait divided by 2, block 112. Because of the query at block 104 as to whether 6 busy polls have occurred, until this event happens, it will be appreciated that the wait continues to be set to the previous wait divided by 2, at block 112 until this has been done 6 times. The net effect of this is that until a preselected number of busy polls has occurred, the wait continues to be reduced by a factor of 2. Thus, after the first busy polls the wait is set to 50% of the last wait and during the next pass (and the next busy poll) the wait then becomes 25% and so on The number of preselected busy polls set in block 4 it will be appreciated may be empirically predetermined. However it has been found in a preferred embodiment that 6 such busy polls are quite effective in that after 6 passes through the routine, this results in 98% of whatever delay had been expected, e.g. it is a decaying poll value (%50+25%+12%+ . . . =98% approximately).

Returning to block 104, FIG. 4, in summary, by executing the right branch (e.g. if 6 busy polls have not occurred yet) the wait is successively divided by factors of 2 such that each subsequent wait is a little less than the prior one (inasmuch as for each successive wait it is expected that the device is getting closer to being ready such as a lesser wait is desired). This is then the reason for successively dividing by 2 and restarting the timer, 114. Returning to block 104, if 6 busy polls have occurred, 120, and the peripheral device is still not ready, the system then begins ramping back up the amount of delay time empirically by a factor of 1.25, 106. In other words, at block 106 the wait time is successively increased by 25%, and again the timer is restarted 114. Once again, if the device remains busy on a busy poll, the path continues down the leftmost side of FIG. 4. If the preceding 6 busy polls have resulted in the device still not being ready (resulting in successive decreases in the delay by dividing by 2 proceeding down the rightmost side of FIG. 4), then the average delay is ramped up successively. This ramping up in delay time is so that the system does not poll excessively if the device is busy for a long period of time.

Thus in summary, regarding FIG. 4, on a first occurrence of a not ready, an average delay is computed in a wait period set to this average divided by 2. Upon occurrence of each successive "not ready", if it is a first such not ready signal since the last output, this right branch of FIG. 4 is executed to successively reduce the average by 2. If, on the other hand, the "not ready" is not a first occurrence or indication of the peripheral device not being ready since the last output, it is determined whether a preselected number of busy polls has occurred yet (in the preferred embodiment 6). If this preselected number of polls has not occurred, the wait is set to the last wait and successively divided by 2, thereby ramping the amount of delay time down as in the case of the right branch of FIG. 4. On the other hand, if the preselected number of busy polls has occurred, the wait is ramped up by multiplying the last wait by 125%.

While the foregoing steps have resulted in an effective peripheral device controller, additional features may be provided if desired. For example, a predetermined delay may be provided such as a delay on the order of 1/10 of a second since such a nominal poll is not particularly noticeable in system load in order to provide improvements in performance in some instances. The reason for this predetermined maximum delay may be for example when a peripheral device is taken off line entirely. Polling during such an eventuality more frequently, particularly with larger maximum delays, may unnecessarily load the system and be a waste of resource, given that the peripheral device is not even on line. However, with a nominal 1/10 second maximum delay poll, once the device comes back on line, to a human perspective the device would appear to start printing essentially immediately while avoiding system load while the device was absent within the relatively small 1/10 second maximum delay.

Yet an additional feature which may desirably be introduced in the subsystem of FIG. 4 relates to computing the average delay shown at block 108. In some instances it may be desirable to provide a check whereby if the most recent delay is greater than predetermined factor times the average, the delay will be limited. As an example, if the average delay is computed at block 108 and is greater than 4 times the average, the system may desirably limit the delay to only 4 times the average. The reason for this is that it may be undesirable to have the average increasing by orders of magnitude just because, for example, when printing to a dot matrix printer and a formfeed occurs, several seconds may transpire before the device is ready for additional character data. This is obviously a characteristic of the particular peripheral device in the system. In this instance it reflects that a slow non-buffered printer has to get paper after a formfeed transported a substantial distance which takes a corresponding long period of time before the printer is ready for a next character. In other words, if the previous delay had been on the order of 10 milliseconds and suddenly a 5 second delay is encountered for a formfeed, it is desirable to avoid ramping up a delay all the way to the 5 second delay associated with a less frequently occurring event such as a formfeed automatically.

With the foregoing in mind, it is therefore apparent that it is desirable to weight large delays so that they do not throw the average off. If the delay turns out to be more normal frequently occurring delays, the computed delay with therefore desirably ramp up. If the delay is greater than 4 times the average or the like, the system will limit the delay to a predetermined factor such as 4 times the average. In this manner the factor (e.g. 4 or the like) will in fact pull the average up but will not pull it up extremely quickly (which would otherwise have occurred if not bounded by the predetermined factor).

Returning to FIG. 3 briefly, it will be noted that in the flow diagram, whether the device is ready is detected at both the process mode and timer mode, shown at block 72 and 86. At this point the CPU is reading the various parallel port interface registers previously described such as the status register and examining several bits indicative of the state of the lines on the printer. Thus this block is essentially performing an "anding" function of several physical factors associated with the printer—e.g. if the printer is ready for a character, if the printer has paper, is on line, and the like, an "and" being positive indicating the printer is ready whereupon the flow exits the bottom of block 72 and 86.

Similarly, blocks occur in both the process mode and timer mode which are performing similar functions, namely at blocks 80, 98. In these blocks, the CPU is writing a value to a register in the timer hardware 10 after computing the appropriate value which, of course, is the delay.

In like manner, similar blocks occur in the process mode and timer mode relating to output. More particularly, block 74 and 88 indicate that at this point the CPU is writing to the data register in the parallel port (typically an 8 bit register) causing data to be presented on the 8 parallel data lines to the printer, shown as data line 26 in FIG. 1.

It will be noted in passing that the system of FIG. 1 may execute any of a number of appropriate interrupt handlers. One interrupt level in a system conventionally may be shared by multiple devices. In this instance, it is necessary for the interrupt routines to check to see if it is the particular interrupt's device causing the interrupt. In response to such detection, the interrupt routine will return a yes or no to the system so the system will know whether to call the next interrupt routine.

It will be recalled from the foregoing that the system employs system timers, e.g. the software timer system services to perform various functions. As aforementioned, a hardware timer 10 is typically provided and several software system timer services all driven off of the timer 10. The timers are utilized to place the process desiring to do a write to the peripheral device in a sleep mode with the amount of time the process sleeps being adjusted iteratively.

Again, by way of summary, in the process mode, the system can be interrupted and pre-empted by more important or other processes. In contrast, in the interrupt or time mode, only a more important interrupt may do so. In the timer mode there is no looping in the sense that the mode gains control, performs its function, sets the timer, may or not wake up a process and then exits, e.g. there is no looping in the timer mode. This is in contrast with the process mode which can loop since in this mode the system is executing remaining processes while one or more other processes is dormant. Also as previously described, these "processes" perform any number of functions, such as in AIX, a line printer queue handler providing a queue to a file to print. As a representative such process, this queue handler might open a parallel printer device driver and write data to it. When the write is performed, the write entry point of the device driver will call the printer queue handler routine. Ultimately, the "calling routine" will thus be seen to be the process desiring to perform the write operation.

Figure 2:
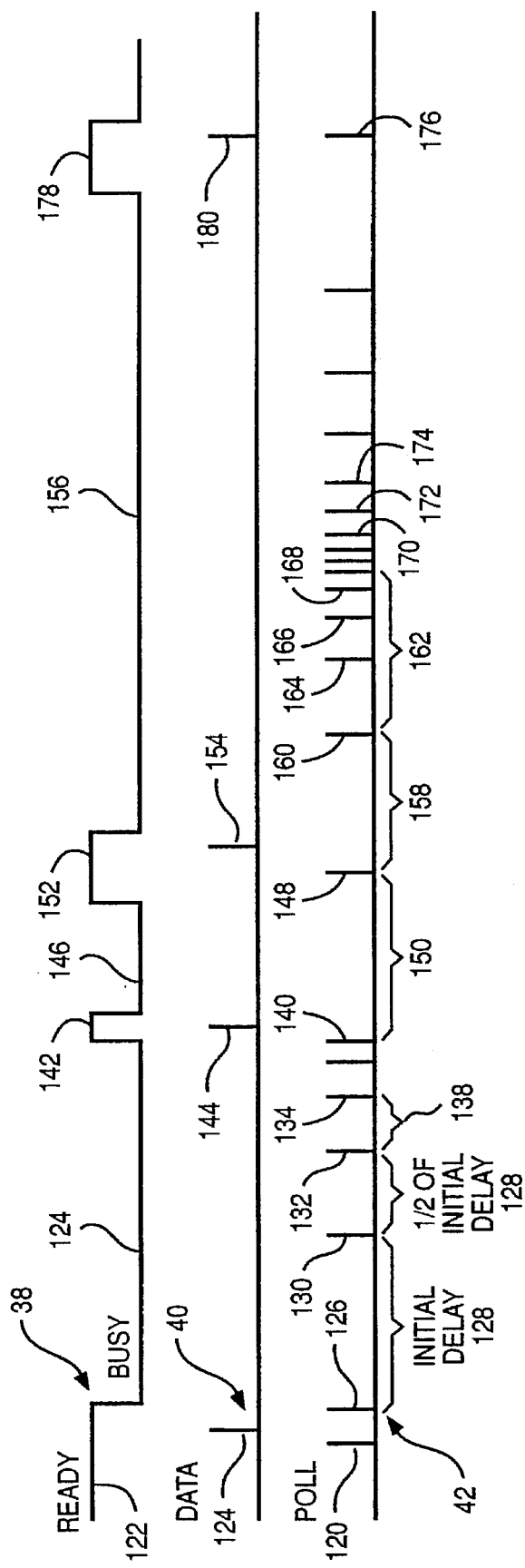
FIG. 2 is a timing diagram illustrating the adaptive polling of the system of FIG. 1 in a variable manner in accordance with the invention.

Turning to FIG. 2, there is shown a timing diagram which will illustrate the operation of the system of FIG. 3. First, a status signal 38 is shown which toggles between the peripheral device being in a ready condition and a busy condition (a logical "high" indicating ready). Secondly, a data timing line 40 is shown, a logical high condition indicating that data is being sent on the data line 26 from the CPU to the printer through the interface. Finally, a polling timing line 42 is shown, logical highs indicating the times at which the CPU 12 is polling the peripheral device through the interface on line 24 to indicate its status.

One thing will be immediately apparent from examining the polling line of FIG. 2, namely that the interval between the polls, unlike in the prior art which was set to a predetermined constant interval corresponding to the expected load, varies in an adaptive way in accordance with the invention. The polling line 42 thus depicts how the adaptive algorithm of the present invention reacts to varying delays as opposed to such delays being on a fixed basis. Between the polls indicated at line 42, the system is performing other tasks of course. It is only when the polling or data signals are present that the system of FIGS. 3 and 4 is actually executing and absorbing system resources.

At 120, a poll occurs to determine if the peripheral device is ready to receive data. Because it is ready, shown by the status line at 122, data is output at 124, and the printer or other device then goes busy, 124. A poll then occurs again, 126, but because the device is now not ready (e.g. is busy printing the data transferred at 124) the "no" branch of block 172 of FIG. 3 is followed whereupon an initial delay is computed and the timer started, 80. This initial delay in the poll may be seen at 128 before occurrence of a next poll 130. Because we have entered the right branch of FIG. 4 in the process mode flow diagram of FIG. 3 in computing the delay and starting the timer, the process is suspended and the timer mode 72 is entered and the timer service routine executed. It will be noted that the next poll 130 occurs while the printer is still busy 124.

Referring back to FIG. 4, since this was the first "not ready", the right branch of FIG. 4 is entered and the average delay, which is, in this case the initial delay, computed, 108, and the wait is then set to the average (e.g. this initial delay) divided by 2 shown at 110. The system is then polled again at this delay divided by 2 shown in FIG. 2 as reference numeral 132. This poll again results in a status check revealing that the printer is still busy, 124. However, since this is no longer the first "not ready" since the last output check at 102, now the left branch of FIG. 4 is entered. Since 6 busy polls have not yet occurred, exit from the right portion of block 104 occurs to set the wait to the previous wait divided by 2 whereupon the system is polled again, 134. It will be noted that the delays successively decrease by a factor of ½ shown as initial delay 128, the next delay 136 and the next delay 138.

At some point in time, after the printer has printed all the data associated with data 124, the printer status goes ready again, shown at 142, after which a poll 140 results in yet a next data output 144. This results in a next busy status 146. A next poll occurs at 148 resulting in a delay 150. It will be noted that this initial delay after poll 140 is slightly shorter than delay 128. This is because this new initial delay when computed is the average of the prior delays determined by blocks 108 and 110. When this poll 148 occurs it will be noted that the printer has completed printing the data associated with data 144 and has again gone to a ready status, 152, whereupon the poll 148 results in yet another data output 154 and associated busy time 156. A next poll 160 occurs. However, the printer is busy, 156 and no subsequent data is output. It will be noted that since this poll 160 is the first "not ready" since the last output 154, the right branch of FIG. 4 is again entered and the wait is set to the average divided by 2, block 110, resulting in a next poll 164. The distance between polls 160 and 164 is smaller than that between polls 160 and 148, indicating that the prior wait has been divided by 2. So long as the printer status remains busy 156, this looping continues through block 102, 104, and 112 to successively set the interval between subsequent polls 166, 168, etc. to being ½ of the prior wait (so long as a total of a predetermined number of busy polls have not been reached yet, in the case of the example 6, as shown at block 104).

Continuing with the description of FIG. 2, because the wait 156 is long enough that 6 busy polls have occurred, when these 6 polls have occurred, the block 104 of FIG. 4 is exited to the bottom, whereupon the interval between subsequent polls is now going to increase by factor of 25%, this ramp-up of the wait interval being caused by the block 106. This in turn results in subsequent polls 170, 172, and 174 occurring such that the interval between them is gradually increasing by a factor of 25%.

In summary then, in viewing FIG. 2, it can be seen that the algorithm first gradually reduces the interval between polls until a predetermined number of unsuccessful polls resulting in no data output occurs (because the printer status is still busy). If this predetermined number of polls of increasingly reduced spacing therebetween reaches the predetermined number without a successful poll resulting in data because the printer has become ready, the system of the invention thereafter gradually starts increasing the interval between polls as shown by the polls 170–174, e.g. the delay is "stretched" until finally a successful poll 176 occurs because the printer status is ready, 178, again resulting in a data output 180.

This representative example of a timing diagram of FIG. 2 illustrates how a badly behaved device with highly varying delays and ready status may be accommodated by the invention wherein an adaptive polling interval is dynamically calculated. An example of such varying delays occurs for example in an IBM Model 4029 laser printer which receives 4K blocks of data bytes. This receipt of data is typically a very repetitive and consistent delay which might be accommodated by peripheral device handlers of the prior art. However, during the processing and printing of these blocks of data, longer busy periods may be encountered of variable times associated with differing types of such data. These varying busy times, including line feeds, sheet feeds, differing data types, differing peripheral devices, internal DMA moves of data, and other delays such as the relatively long delays in internal processing and interpreting of complex postscript data, result in the widely varying intervals heretofore handled very poorly with peripheral device handlers of the prior art. As previously described, a relatively simple dot matrix printer handling simple ASCII text results in very similar delays except for those associated with end of line, backspace, former line feeds, etc. However, even with these simple printers, widely differing delays may occur, all contributing to the problem of efficient handling of such peripheral devices. To further illustrate the need for the invention, older printer drivers utilized for example with the AIX system sometimes resulted in the system remaining in an interrupt routine too long. The system would get an interrupt for a parallel port, enter the interrupt handler routine, and remain for too long a period, resulting in adverse effects in system performance. It will be recalled that in the timer mode interrupts are disabled for a short period of time, and interrupts being blocked (such as those for a mouse) might result in jerky and sporadic movement of the mouse which was obviously undesirable.

The following table indicates an overview of the adaptive polling system of the present invention in pseudo code corresponding to the process mode 71 of FIG. 3.

TABLE 2

| 1 | ready_loop: |
| 2 | if output buffer is empty |
| 3 | then |
| 4 |     return to calling routine |
| 5 | if paper is read |
| 6 | then |
| 7 |     output next byte to printer |
| 8 |     goto ready_loop |
| 9 | else printer is busy |
| 10 |     compute sleep time |
| 11 |     sleep |
| 12 |     goto read_loop |

The following Table 3 indicates in pseudo code the flow for computing the sleep time, e.g. the timer mode 72 of FIG. 3 wherein, it will be recalled, a feature is to provide for a variable and adaptively determined sequence of periods whereby the sleep period is not too long (so as to maximize data throughput) while at the same time minimizing CPU load (e.g. avoiding excessive busy polling associated with inordinately short sleeping periods).

TABLE 3

| 13 | if this is a ready-to-busy transition |
| 14 | then |
| 15 |     recompute average busy delay |
| 16 |     sleep time = average busy delay / 2 |
| 17 |     busy count = 0 |
| 18 | else the printer was busy last time |
| 19 |     if busy count is less than 6 |
| 20 |         sleep time = sleep time / 2 |
| 21 |     else if busy count is great than 16 |
| 22 |         sleep time = sleep time × 1.25 |
| 23 |     compute total wait time |
| 24 |     increment busy count |

It will be noted from the foregoing pseudo code that yet additional features may, if desired, be introduced into the system not shown in FIGS. 3 and 4. For example, although the busy poll count is cumulated and shown at line 19 of Table 3, (consistent with block 104 of FIG. 4), reference to line 21 of Table 3 indicates in the pseudo code a test for a busy count greater than 16 not present in the flow diagram of FIG. 3.

The reason for this as follows. Once there has been a ramping down by 6 successively shorter polling intervals, and the printer is still busy, the system will provide for a successive polling at that shorter interval for a predetermined number of further polls before ramping up by 25% as shown in block 106. In other words, the polling interval will be successively decreased until a predetermined number is reached such as 6, whereupon subsequent polling remains at the same small decreased interval for a predetermined number of times such as 10. If the printer has not become ready at that point, then rather than continuing to poll at this reduced interval thereby tying up the system, only at that point is the ramp-up engaged in thereafter increase the polling interval successively.

Again, it will be appreciated that it is a feature of the invention to provide an adaptive polling interval adjustment whereby the polling interval gradually decreases, and then, if desired, remains at a constant reduced interval if the peripheral device is not available, and only thereafter does the polling interval magnitude gradually increase up to a maximum. These predetermined maximum number of polls of a decreasing interval size, predetermined number of maximum polls at the same reduced interval size, and the maximum polling interval, it will readily be noted, are subject to tuning for the particular system involved and particular peripherals involved. The invention is accordingly not intended to be limited to the 6 decreasing polls or 10 polls of a constant small interval, and the like. Selection of the appropriate numbers may be obtained by one of ordinary skill, in accordance with conventional, accepted, good practice, simply tuning the systems as desired.

While the invention has been shown and described with reference to particular embodiments thereof, it will be understood by those skilled in the art that the foregoing and other changes in form and detail may be made therein without departing from the spirit and scope of the invention.

We claim:

1. A method for controlling a peripheral device in a computer system having associated therewith ready signals and busy signals comprising:

generating a sequence of first polling signals defining a corresponding sequence of first intervals of decreasing magnitudes whose magnitudes are functionally related to frequency of occurrence of said busy signals, wherein a given one of said first intervals being determined from a running average of preceding ones of said first intervals;

executing status checks of said peripheral device with said first polling signals;

generating a sequence of second polling signals defining a corresponding sequence of second intervals of increasing magnitudes occurring after said first intervals, and wherein a given one of said second intervals is determined from a running average of preceding ones of said second intervals, said increasing magnitudes being functionally related to frequency of occurrence of said busy signals;

executing status checks of said peripheral device with said second polling signals;

generating a sequence of third polling signals defining a corresponding sequence of third intervals of constant magnitude occurring between said first and said third intervals functionally related to frequency of occurrence of said busy signals; and executing status checks of said peripheral with said third polling signals.

2. The method of claim 1 wherein said third intervals occur between said first and said second intervals.

3. The method of claim 2 wherein said constant magnitude of said third intervals is predetermined.

4. The method of claim 3 wherein said constant magnitude of said third intervals is less than any of said decreasing and increasing magnitudes.

5. The method of claim 4 including generating a sequence of fourth polling signals after said sequence of second polling signals defining a corresponding sequence of fourth intervals of constant magnitude whose magnitude is functionally related to frequency of occurrence of said busy signals; and executing status checks of said peripheral with said fourth polling signals.

6. The method of claim 5 wherein said constant magnitude of said fourth intervals is predetermined.

7. The method of claim 5 wherein said constant magnitude of said fourth intervals is greater than said constant magnitude of said second intervals.

8. A method for efficient management of input-output in a computer system including a peripheral, comprising:

generating polling signals;

checking busy status of said peripheral;

monitoring prior delays associated with said busy status in response to said polling signals; and adaptively generating subsequent polling signals at intervals functionally related to said monitoring;

and wherein said monitoring comprises detecting whether said peripheral device is in said busy status, and A. when said busy status is detected,
A(1) updating statistical delay data;
A(2) computing a delay value; and
A(3) restarting a timer;

B. when said busy status is not detected,
B(1) outputting data to said device;
B(2) detecting whether additional said data is available for output;
B(3) when said additional data is detected as available for output, determining whether a prior delay associated with said busy status is less than a threshold;
B(3)a executing .step A if said prior delay is not less than said threshold; and
B(3)b executing step B(5) if said prior delay is less than said threshold;
B(4) when said additional data is detected as not available for output executing step B(5); and
B(5) re-activating a process executing on said system in response to step B(3)b or step B(4).

9. The method of claim 8 wherein said steps of computing and starting said timer further comprise:

D. detecting a first busy status since a last output to said peripheral device;

computing an average delay of said output to said peripheral device;

setting a wait period before said generating one of said subsequent polling signals comprised of a fraction of said average delays; and executing step A(3);

E. detecting absence of a first busy status since a last output to said peripheral device;
E(1). detecting a preselected number of busy polls has occurred;
setting a wait period before said generating one of said next polling signals comprised of a product of a preceding said wait period and a predetermined number greater than zero; and
executing step A(3);
E(2). detecting absence of occurrence of a preselected number of busy polls;
setting a wait period before said generating one of said next polling signals comprised of a predetermined fraction of a preceding said wait period; and
executing step A(3).

10. A system for controlling a peripheral device in a computer system comprising:

means for generating a sequence of first polling signals defining a corresponding sequence of first intervals of decreasing magnitudes whose magnitudes are functionally related to frequency of occurrence of said busy signals, wherein a given one of said first intervals being determined from a running average of preceding ones of said first intervals;

means for executing status checks of said peripheral device with said first polling signals;

means for generating a sequence of second polling signals defining a corresponding sequence of second intervals occurring after said first intervals, said second intervals being of increasing magnitudes whose magnitudes are functionally related to frequency of occurrence of said busy signals;

means for executing status checks of said peripheral device with said second polling signals;

wherein a given one of said second intervals is determined from an average of preceding ones of said second intervals;

means for generating a sequence of third polling signals defining a corresponding sequence of third intervals of constant magnitude occurring between said first and said third intervals whose magnitudes are functionally related to frequency of occurrence of said busy signals; and means for executing status checks of said peripheral with said third polling signals.

* * * * *